(12) United States Patent
Gavit et al.

(10) Patent No.: US 6,876,512 B2
(45) Date of Patent: Apr. 5, 2005

(54) TAPE CARTRIDGE DOCKING APPARATUS FOR READ/WRITE RECORDING ASSEMBLIES AND METHOD THEREFOR

(75) Inventors: Stephan E. Gavit, Littleton, CO (US); Christopher D. Goldsmith, Littleton, CO (US)

(73) Assignee: Segway Systems, LLC, Littleton, CO (US)

( * ) Notice: Subject to any disclaimer, the term of this patent is extended or adjusted under 35 U.S.C. 154(b) by 0 days.

(21) Appl. No.: 10/486,492
(22) PCT Filed: Aug. 7, 2002
(86) PCT No.: PCT/US02/25037
§ 371 (c)(1), (2), (4) Date: Feb. 9, 2004
(87) PCT Pub. No.: WO03/015087
PCT Pub. Date: Feb. 20, 2003

(65) Prior Publication Data
US 2004/0207951 A1 Oct. 21, 2004

Related U.S. Application Data
(60) Provisional application No. 60/310,931, filed on Aug. 7, 2001.

(51) Int. Cl.[7] ............................................. G11B 5/008
(52) U.S. Cl. ...................................................... 360/96.6
(58) Field of Search ..................... 360/99.07, 96.5–96.6

(56) References Cited

U.S. PATENT DOCUMENTS

| | | | | |
|---|---|---|---|---|
| 3,833,224 A | * | 9/1974 | Haake | 360/92 |
| 4,009,493 A | * | 2/1977 | Habelt | 360/96.6 |
| 5,629,816 A | * | 5/1997 | Busengdal et al. | 360/96.5 |

* cited by examiner

*Primary Examiner*—A. J. Heinz
(74) *Attorney, Agent, or Firm*—Timothy J. Martin; Michael R. Henson; Rebecca A. Gegick

(57) ABSTRACT

A docking apparatus and method is used in a read/write recording assembly (10) and includes a bay structure, such as a sub-frame (50), adapted to receive a tape cartridge (18) The sub-frame (50) is disclosed to pivot relative to the assembly's main frame. A pawl element (78) is controlled by a cam assembly (40) in a first mode so as to move from an advanced position to a withdrawn position thereby to move the cartridge (18) from a received/extended position to a received/retracted position. The cam assembly (40) also mounts the cartridge (18), for example, by pivoting the sub-frame (50) relative to the main frame. Driving the cam assembly (40) in a second mode reverses this operation. The cam assembly (40) may use a single rotatable cam element (72) to accomplish the loading and mounting of the cartridge (18), and a suitable drive actuates the cam assembly (40).

27 Claims, 7 Drawing Sheets

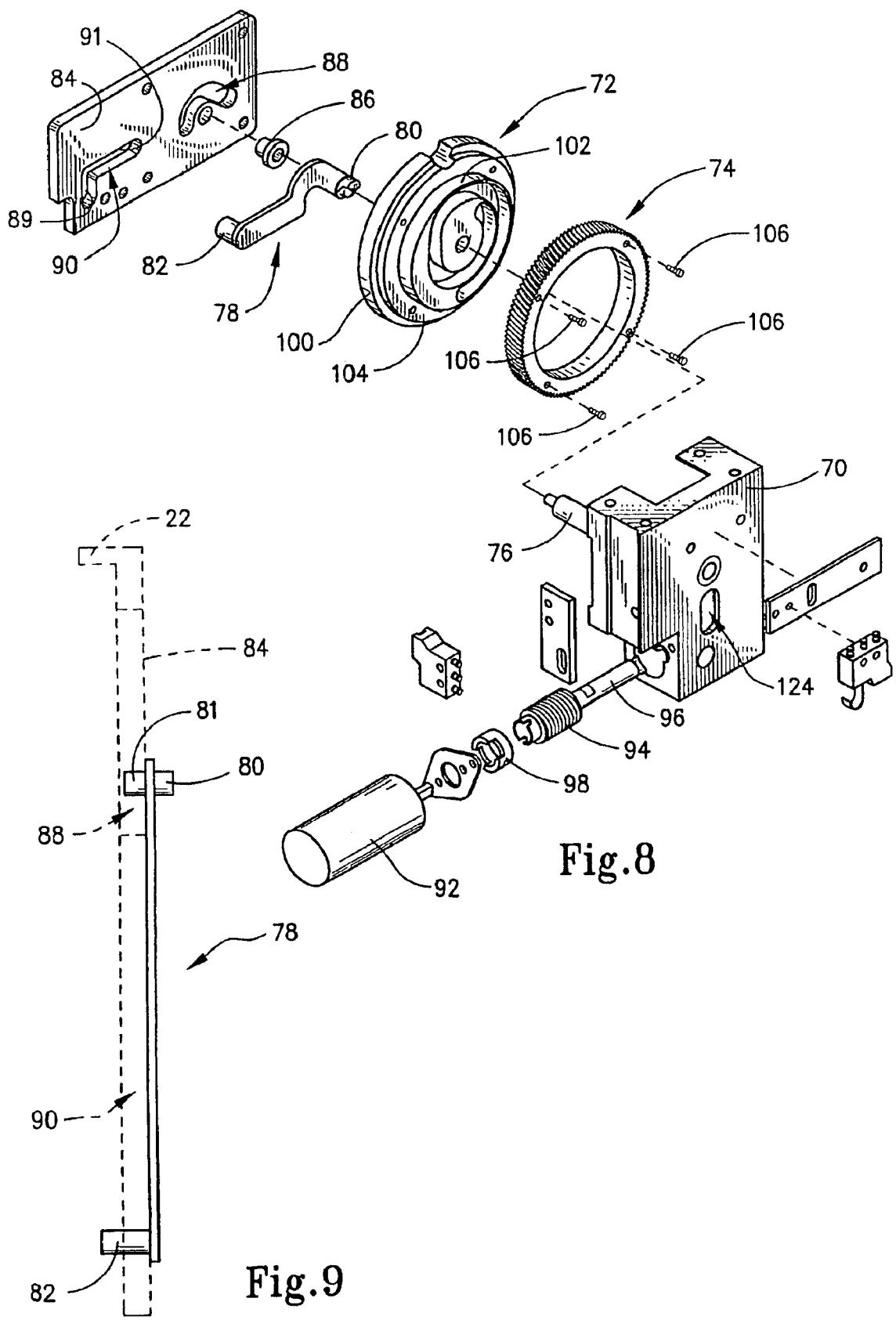

TAPE CARTRIDGE DOCKING APPARATUS FOR READ/WRITE RECORDING ASSEMBLIES AND METHOD THEREFOR

CROSS-REFERENCE TO RELATED APPLICATION

This application claims the benefit of U.S. Provisional Application No. 60/310,931, filed Aug. 7, 2001.

FIELD OF THE INVENTION

The present invention broadly concerns apparatus and methods used to store and retrieve information on the storage media, such as magnetic tapes. In particular, this invention is directed to a tape cartridge docking apparatus and method that is used to load a tape cartridge into a read/write recording assembly. While the present invention is described with respect to the storage and retrieval of data on magnetic tapes housed in cartridges, it should be understood that the apparatus and methods may be employed with other tape media either as presently existing or as hereinafter may be developed.

BACKGROUND OF THE INVENTION

The advent of the computer has already had a profound effect upon human society, and the impact of processing technology is expected to increase. Indeed, the desirability to store information for subsequent retrieval currently grows at an exponential rate. Thus, various types of devices have been developed to store data both for on-line usage as well as for archival purposes.

Where on-line processing requires data to be readily at hand, a significant improvement was provided by the advent of the magnetic disk storage array. Here, one or more magnetic disks are provided, and a read/write recording head is used to record information on the disk as well as to retrieve information or data for use by the computer processor. Significant strides have been made in the ability to increase the density of data stored on such magnetic disk arrays. In order to gain an even higher density for on-line data, the optical disk was developed. These devices record data based upon a very small wavelength of light so that a higher density is obtained due to this technique. Laser light is employed to read the stored information or data on the optical disk.

In early days of the computer, before the advent of the magnetic disks and the optical disk storage assemblies, data was typically stored on magnetic tapes, such as reel-to-reel tapes and later cassettes or cartridges. In a magnetic tape storage device, a magnetic coil is used as a transducer to imprint data magnetically on a moving band of magnetic film; thereafter, when the film is advanced across the transducer, the data may be read and re-input into a co-processor. Magnetic tape can be erased and rewritten many times and has an advantage of low cost.

Magnetic tape is still a highly desirable format for archiving data for rapid access is of less significance and cost is of concern. However, where vast quantities of data are to be maintained, these tapes can be bulky due to the physical number necessary to store the quantity of data. The capacity for such tapes to store data, of course, is dependent upon the number of "tracks" which can be independently placed across the width of the tape.

The ability to write data rapidly onto a magnetic tape film and the accessibility of data to be read from the film is a function of two variables: (1) the density of storage; and (2) the speed at which the tape medium may be transported across and accurately written/read by the transducer. Thus, for example, a magnetic tape read/write system that is able to read and write nine tracks of data on a single strip of tape will hold four and one-half times the amount of data as a system which only utilizes two tracks. Therefore, efforts to increase the capacity of magnetic tapes to store data have included substantial efforts to increase the number of tracks which can be written on a band of magnetic tape.

In the above-described systems, storage reels of tape, whether flanged or flange-less (for example as used in cartridges) may be placed on the machine during use. A threading assembly engages the free end of the tape and passes it through the machine. Typically, the tape is threaded across air bearings, past the transducer and into a take-up hub or reel. The length of the tape is then passed through the machine so that information may be placed on the tape or retrieved therefrom. During this process, the length of tape is transferred onto a take-up reel or hub that is either a part of the machine itself, included within the cartridge or that is mounted and demounted from such machine. After being transported through the machine, the tape may be rewound onto the storage reel and removed from the machine.

In the tape cartridge read/write recording system of the type identified above, it is necessary to insert a cartridge into the machine so that the tape medium contained within the cartridge may be threaded through the machine to perform a read/write function thereon. While this can accomplished manually, most systems incorporate automated assemblies, such as an automated tape library system, that will initially place a tape cartridge in the read/write recording system to define a received state for the cartridge. The read/write recording system is then actuated to retract the tape cartridge and mount it in the read/write recording assembly. After performance of the read/write recording function, the read/write recording assembly demounts the cartridge and extends it so that the tape cartridge may again be retrieved by the automated library system.

The present invention is directed to a tape cartridge docking apparatus associated with a read/write recording assembly that receives the tape cartridge, mounts the tape cartridge and demounts the tape cartridge from the read/write assembly. The invention is also directed to a read/write recording assembly incorporating such docking apparatus as well as the methods accomplished by the docking apparatus.

SUMMARY OF THE INVENTION

It is an object of the present invention to provide a new and useful tape cartridge docking apparatus that may be used in a read/write recording assembly.

Another object of the present invention is to provide a new and useful read/write recording assembly that incorporates such a tape docking apparatus.

It is a further object of the present invention to provide a new and useful method of mounting and demounting a tape cartridge onto a read/write recording assembly.

Still a further object of the present invention is to provide a simplified docking apparatus and method that is inexpensive to manufacture yet which is highly reliable in use.

Yet a further object of the present invention is to provide a docking apparatus that utilizes a cam assembly incorporating a single cam element that performs multitude of tasks in the docking method.

To accomplish these objects, the present invention is accordingly directed to a docking apparatus operative to receive a tape cartridge and mount and demount the tape cartridge relative to a tape read/write recording assembly. Broadly, the docking apparatus includes a bay structure that is adapted to receive the tape cartridge to define a received/extended position therefor. A pawl element includes a first pawl end portion and a second pawl end portion opposite the first pawl end portion. The pawl element is movable between an advanced positioned and a withdrawn position. The first pawl end portion is adapted to engage and disengage the tape cartridge when the tape cartridge is in the received/extended position and the pawl element is in the advanced position. A cam assembly then engages the second end portion of the pawl element. The cam assembly is operative upon being driven in a first mode to move the pawl element from the advanced position to the withdrawn position thereby to move the cartridge from the received/extended position to a received/retracted position. The cam assembly is further operative to advance the cartridge into a mounted state relative to the tape read/write assembly. The cam assembly is further operative upon being driven in a second mode to move the cartridge from the mounted state into a demounted state relative to the read/write assembly and further is operative to move the pawl element from the withdrawn position to the advanced position thereby to move the tape cartridge from the received/retracted position to the received/extended position. A drive is then provided to actuate the cam assembly selectively in the first and second modes.

More specifically, the cam assembly can include a rotatable cam element. The drive is then operative in a first mode to drive the cam element in a first angular direction and in the second mode to drive the cam element in a second angular direction oppositely of the first angular direction. The cam element then has a first surface with a docking cam groove formed therein, and the second end portion of the pawl element includes a cam follower disposed thereon with this cam follower engaging the docking cam groove. The docking cam groove has a load section and a docking dwell section. The cam follower resides in the load section while the pawl element is advanced between the advanced and withdrawn positions and then can reside in the dwell docking dwell section while the cam element performs other tasks. The cam element can have a second surface with a mounting groove that engages a link element operation to mount and demount the cartridge.

The cam assembly can also include a pawl control plate that is operative to control the pawl element as it moves between the advanced position and the withdrawn position. In the exemplary embodiment, the pawl control plate has a guide slot that is operative to engage the first end portion of the pawl element and a control slot that is operative to engage the second end portion of the pawl element. Here, the pawl element includes a first finger that engages the guide slot and a second finger that engages the control slot. Where the tape cartridge has a handling slot, the first finger is sized to extend through the guide slot of the pawl control plate so that it may selectively engage and disengage the handling slot on the cartridge. Here, also, the guide slot has a first leg portion and a second leg portion. The first finger moves and the first leg portion when the first finger moves into engagement and disengagement with the handling slot and the first finger moves in the second leg portion when the pawl element moves between the advanced position and the withdrawn position. Where tape cartridge includes a tape access door, the pawl control plate can also include a flange positioned to engage and open the tape access door when the cartridge moves from the received/extended position to received/retracted.

In the docking apparatus according to the exemplary embodiment, the tape read/write assembly includes a main frame. A sub-frame is then pivotally secured to the main frame and is movable between the first position to define a demounted state for the cartridge and a second position to define the mounted state for the cartridge. This sub-frame includes a docking bay that is adapted to receive the tape cartridge to define a received/extended position therefor. A pawl element and a cam assembly, as described above, is included in this docking apparatus. Here, a linking element is associated with the main frame and the sub-frame. The cam assembly then includes a first cam component that engages the pawl element to move the pawl element between the advanced position and the withdrawn position. The cam assembly includes a second cam component that engages the link element. This second cam component is operative when the cam assembly is driven in the first mode to move the sub-frame from the first position to the second position thereby to define a mounted state for the cartridge. The second cam component is operative when the cam assembly is driven in the second mode to move the sub-frame from the second position to the first position thereby to define a demounted state for the cartridge. Suitable timing dwells are provided.

In this embodiment, a single rotatable cam element is provided with a docking cam groove formed on a first surface and a mounting cam groove formed on a second surface thereof. A pawl control plate, as described above, is again provided. Here, the cam assembly may also be mounted to the sub-frame with the drive being mounted to the cam assembly. The pawl control plate is mounted to the cam assembly and the pawl element is supported by the pawl control plate and the cam assembly.

The present invention also includes a read/write recording assembly incorporating the docking apparatus described above. The read/write recording assembly includes a main frame and a sub-frame that is pivotally secured to the main frame. Here, again, the sub-frame is movable between a first position to define a demounted state for the tape cartridge and a second position to define a mounted state for the cartridge. The sub-frame includes a docking bay adapted to receive the tape cartridge to define a received/extended position therefor. The read/write recording assembly includes a read/write recording head disposed in the main frame and first and second bearing members located in the upstream location and a downstream location, respectively, with respect to the read/write recording head. A take up mechanism is supported in the main frame and includes a hub having an outer surface about which the tape medium is to be wound. A rotatable drive operates to rotate the hub and wind the tape medium thereon, and a threading assembly is operative to transport a free end of the tape medium between the tape cartridge and the take up mechanism. A pawl element, a cam assembly and a drive as described above is incorporated, then, into this read/write recording assembly.

The present invention is also directed to a method of mounted and demounted a tape cartridge containing a tape medium onto a read/write recording assembly. This method may include any of the processing steps inherent in the above-described structure. Broadly, though, the method of this invention includes inserting the tape cartridge into a bay formed on the sub-frame that is pivotally secured to the main frame of the read/write recording assembly to define a received/extended state for the tape cartridge. The method includes the step of engaging the tape cartridge and advancing it from the received/extended state to a received/retracted state. The sub-frame is then pivoted relative to the main frame from a first position to a second position to move the tape cartridge from a demounted state into a mounted state relative to the read/write recording assembly. The tape medium is then advanced through the read/write recording apparatus to perform a read/write function thereon. After performing the read/write function, the tape medium is restored in the tape cartridge. The sub-frame is then pivoted from the second position to the first position to demount and move the tape cartridge into the received/retracted position. The method then includes the step of advancing the tape cartridge from the received/retracted position to the received/extended position and disengaging and removing the tape cartridge from the bay of the sub-frame.

These and other objects of the present invention will become more readily appreciated and understood from a consideration of the following detailed description of the exemplary embodiment when taken together with the accompanying drawings, in which:

BRIEF DESCRIPTION OF THE DRAWINGS

FIG. 8 is an exploded view of the drive and camming assembly of FIG. 7;

FIG. 9 is a top view in elevation showing the pawl element used to load a cartridge according to the present invention with the pawl guide plate shown in phantom;

DETAILED DESCRIPTION OF THE EXEMPLARY EMBODIMENTS

The present invention is directed to a tape read/write recording assembly which is operative to receive a tape cartridge, thread the tape from the tape cartridge around a bearing system and read/write head, transfer the tape from tape cartridge onto a take-up spool and thereafter reverse the tape so that it is restored in the tape cartridge. The present invention is particularly directed to an automated docking system which can receive tape cartridges from a tape library apparatus (not shown) to selectively receive, mount and demount the tape cartridges in an automated system. The present invention also encompasses the method of mounting and demounting a tape cartridge by means of the steps described and inherent in this structure as described below.

The present invention includes a read/write recording assembly that incorporates this tape cartridge docking apparatus. While the recording assembly may be used with an automated library system wherein the library system mechanism will deliver a tape to the tape deck and partially insert it therein to define a received/extended position, it should be understood that the docking apparatus may be use in manually loaded systems. The tape cartridge docking apparatus of the present invention pulls the tape from the received/extended position into the tape deck in a received/retracted position and thereafter moves it from a demounted state to a mounted state relative to the read/write recording assembly. The apparatus and method of the present invention then picks the tape and threads it around an air bearing support and across a read/write head so that it may be wound onto a take-up spool internal of the tape deck. Thereafter, the process is reversed to restore the tape into the cartridge, demount the cartridge and move it from the retracted position to the extended position. Thereafter, the automated tape library system can remove the tape and return it to an archived location. As noted, although the present invention is contemplated for use with automated tape library systems, it should be understood that tape cartridges may be manually inserted into the tape deck.

The major structural features of the present invention are then described with respect to the figures presented herewith as well as the accompanying description. It should be appreciated that the present invention may be implemented in a variety of different tape read/write environments, but that the structure described herein is particularly suitable for this invention.

Figure 1:
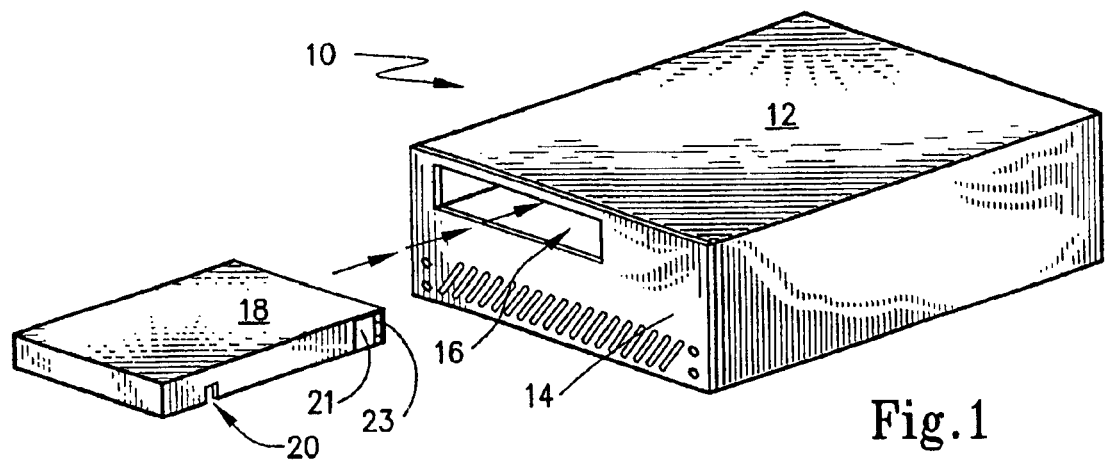
FIG. 1 is a perspective view of a tape deck or cartridge system and a tape cartridge incorporating the systems and methods of the present invention.

With reference to FIG. 1, a read/write recording assembly or deck 10 is illustrated and includes a housing 12 with a front cover plate 14 having an opening 16 formed therein. A tape cartridge 18 is adapted for insertion into the interior of tape deck 10 through opening 16. Tape cartridge 18 includes a cartridge handling slot 20 that is of a standard structure in the industry. Tape cartridge 18 typically includes a tape access door 21 including a actuating tab 23. While reference is made to a read/write recording assembly, it should be understood that such phrase may refer to a read only assembly, a write only assembly or an assembly that performs both read and write functions.

Figure 2:
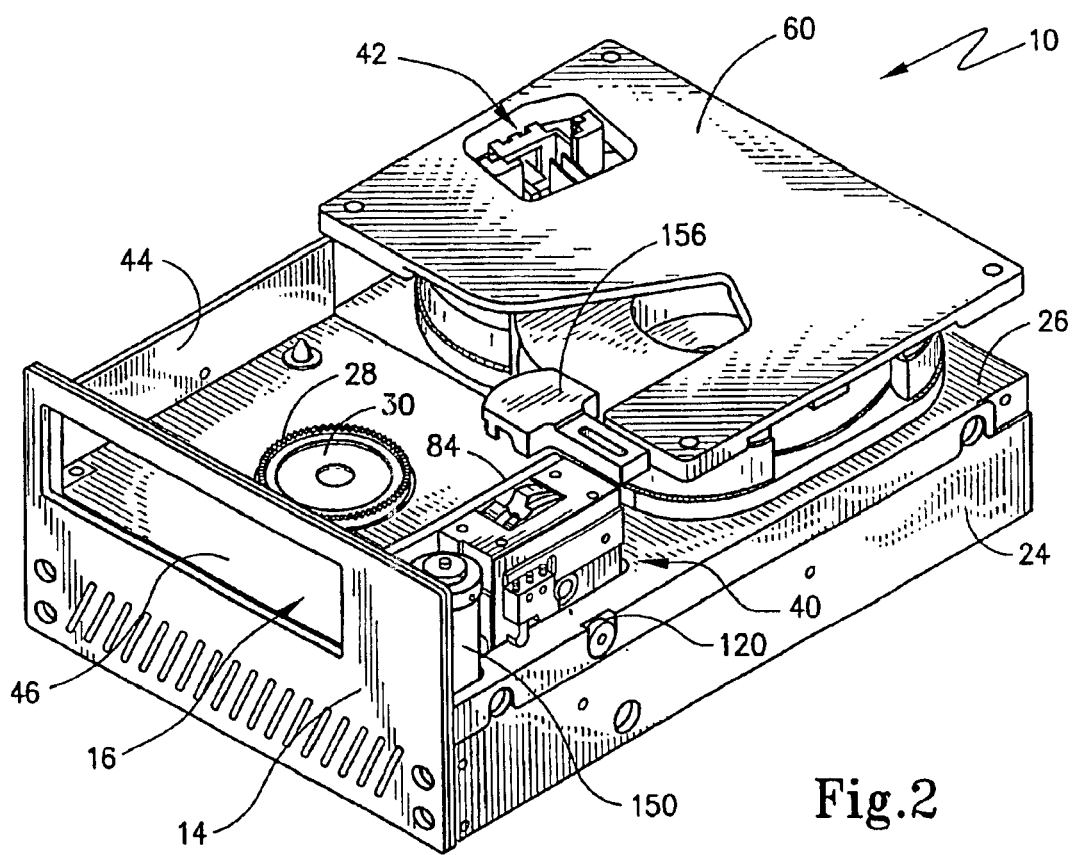
FIG. 2 is a perspective view of the tape cartridge loading and threading apparatus of the present invention with the pivoting cartridge housing removed therefrom.

As is shown in FIG. 2, tape deck 10 includes a main frame 24 that includes a mounting plate 26 to which a take-up reel, air bearings and a read/write head are secured, as described below. Mounting plate 26 also supports a motor assembly (not shown) that includes a toothed drive 28 and a magnet 30 as is known in the art. Tape deck 10 also includes a drive and cam assembly 40 for docking the tape cartridge 18. A tape threading guide plate 60 and a bearing 156 along with a threading motor 150, all as described more thoroughly below, are mounted in this structure. It should be understood that guide plate 60, bearing 156 and motor 150 are mounted to a pivotal sub-housing 50, also described below.

Figure 3:
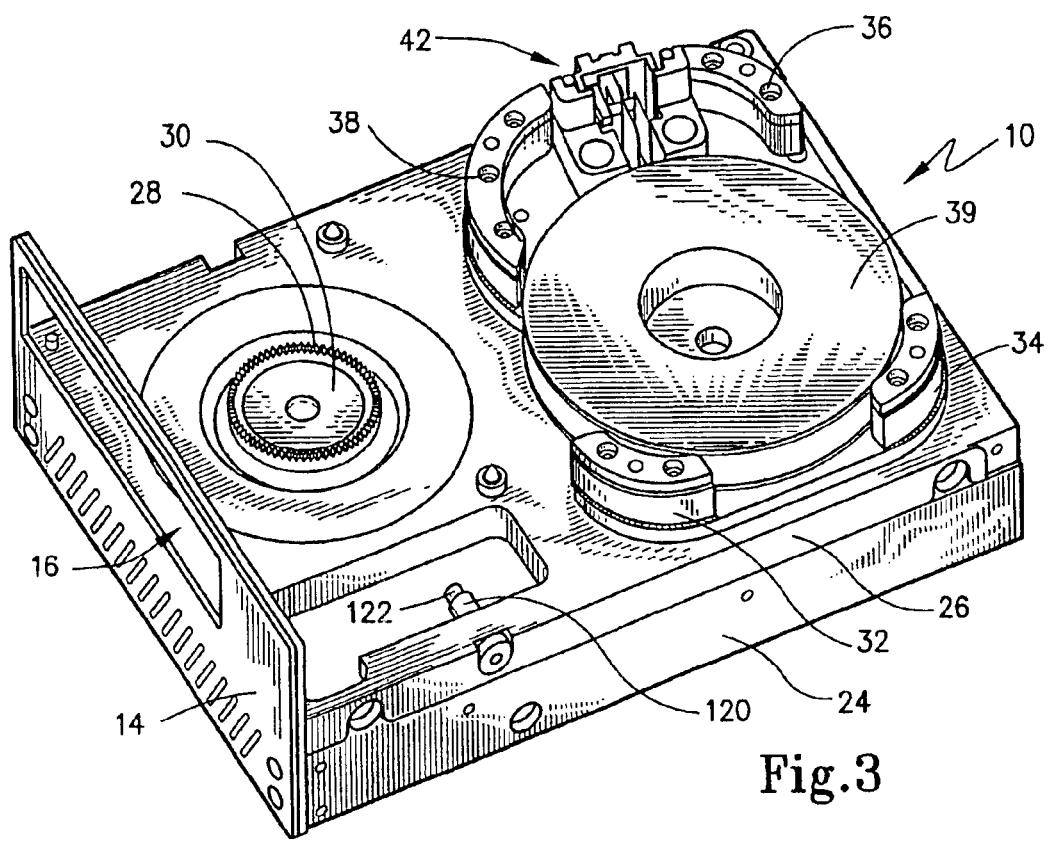
FIG. 3 is a perspective view of the tape cartridge assembly of FIGS. 1 and 2 showing the threading guide and loading assembly removed therefrom to reveal the take-up reel, air bearings and read/write head.

With reference to FIG. 3, it may be seen that tape deck 10 includes a plurality of air bearings 32, 34, 36 and 38 about which a tape will be trained so that it may be engaged in a take-up spool 39. Air bearings 32, 34, 36 and 38 can be any type of air bearing known in the art, although it is preferred that these air bearings be constructed in accordance with the teachings of U.S. Pat. No. 5,777,823, issued Jul. 7, 1998 to Gavit, one of the inventors for the present invention. In addition to these air bearings, tape deck 10 includes a read/write recording head 42 in order to retrieve information from the tape or record information onto the tape. Thus, it should be understood that read/write recording head 42 could be a write only head, a read only head, or a recording head that could perform both read and write functions.

Figure 4:
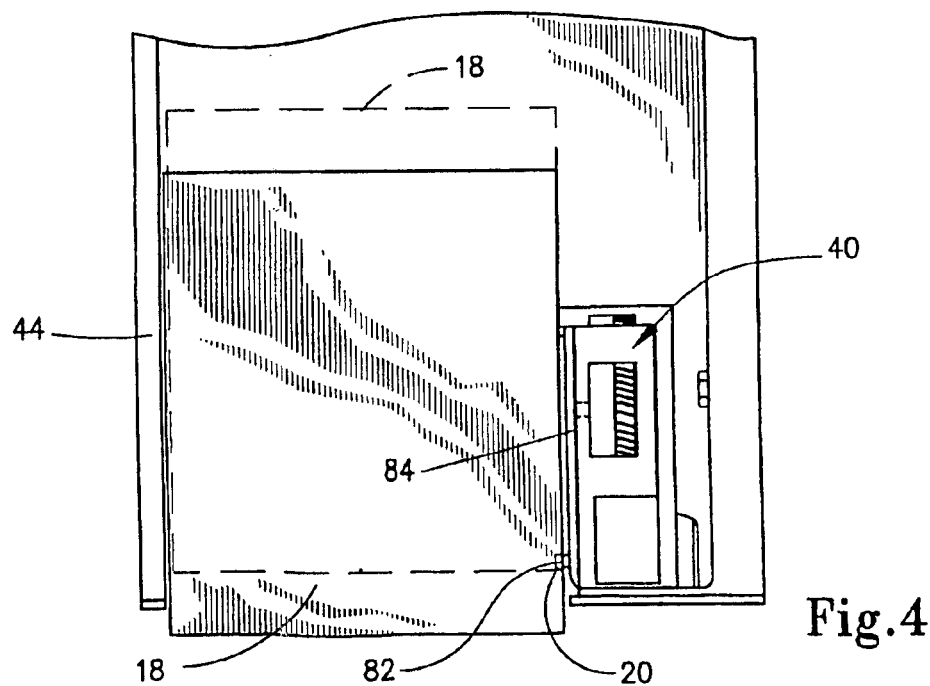
FIG. 4 is a top plan view, in partial cross-section showing the loading of the tape cartridge into the tape apparatus of FIGS. 1–3.
Figure 5:
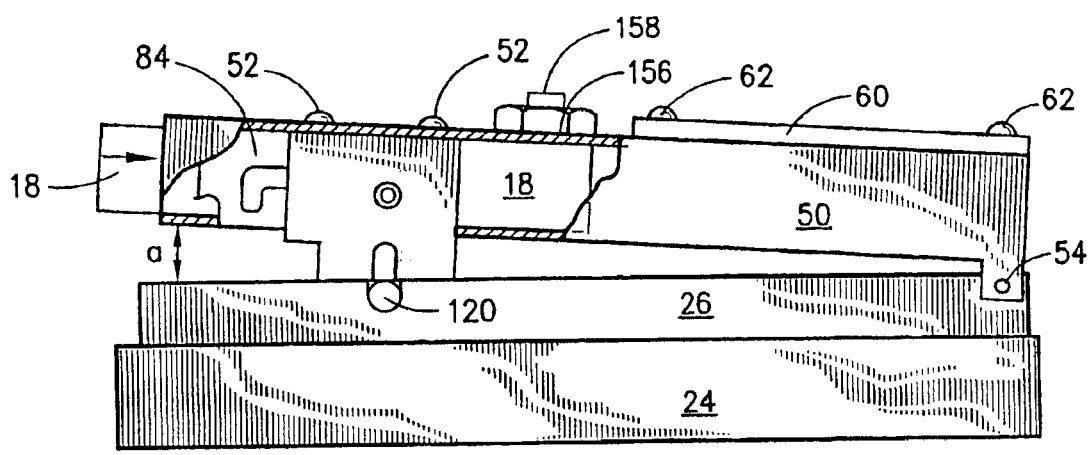
FIG. 5 is a side view partially broken-away showing the cartridge mount/demount assembly of the present invention with the cartridge in a received/extended position with the cartridge in a demounted state.
Figure 6:
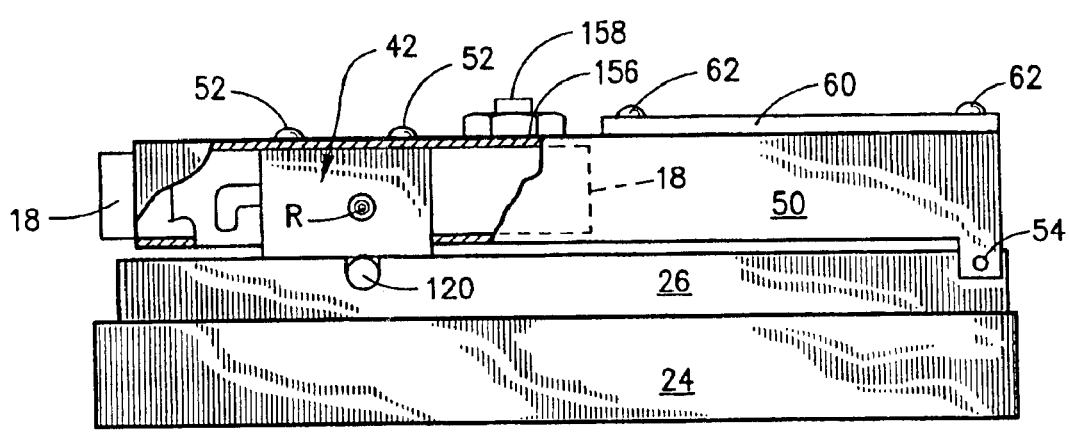
FIG. 6 is a side view partially broken-away, similar to FIG. 5, but showing the tape cartridge in a received/retracted position and in a mounted state.

With reference now to FIG. 4, tape cartridge 18 is shown in a received but demounted state within the mounting assembly of tape deck 10. As is shown in this Figure, cartridge 18 is supported by means of a side plate 44 and a lower panel 46 secured to side plate 44. In FIG. 4, tape cartridge 18 is shown in the received/extended position with cartridge 18 positioned and supported between side plate 44 and side plate 84 of drive and cam assembly 40. Tape cartridge 18 is also shown, in phantom, in the received/retracted state although it remains demounted from the toothed drive 28 and magnet 30. The received/extended position is also shown in FIG. 5 where it can be seen that tape cartridge 18 is received in a bay formed by pivoting sub-frame 50 but is extended outwardly from the receiving bay. Here, also, sub-frame 50 is shown such that cartridge 18 is in a demounted state with sub-frame 50 being oriented at a small acute angle "a" with respect to the horizontal surface of mounting plate 26. Threading guide plate 60 is mounted to sub-frame 50 by screws 62. Likewise, drive and cam assembly 40 is secured to sub-frame 50 by means of screws 52. In FIG. 6, it is seen that tape cartridge 18 has been moved into the received/retracted position and sub-frame 50 has moved cartridge 18 from the demounted state to the mounted state by virtue of being pivoted with respect to mounting plate 26 about hinge 54 in the manner described below.

Figure 7:
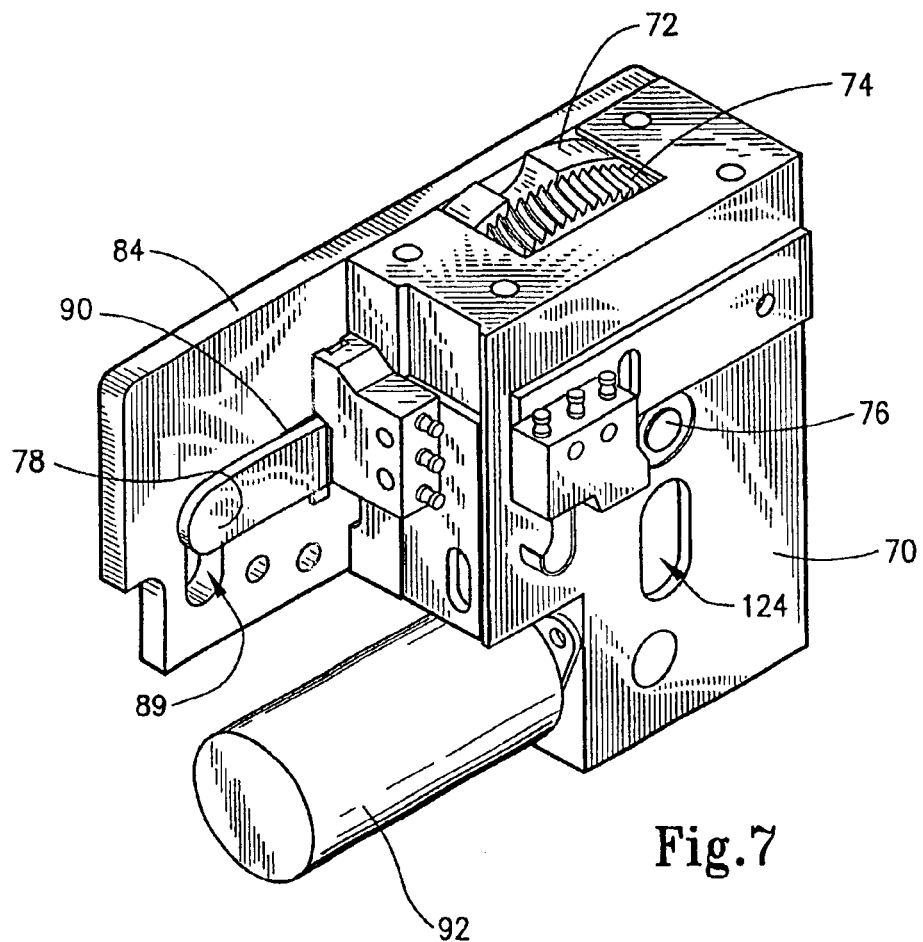
FIG. 7 is a perspective view of the drive and camming assembly for mounting and demounting a tape cartridge used in the present invention.

In order to move tape cartridge 18 between the extended and retracted positions as well as to move cartridge 18 between the demounted state and the mounted state, a drive and cam assembly 40 is provided, as noted above. This assembly is best shown in FIGS. 7 and 8. In these figures, it may be seen that drive and cam assembly 40 includes a gear box 70 which mounts a cam element 72 and an annular gear 74 on an axial pin 76. A pawl element 78 (also shown in FIG. 9) includes a first cam follower 80 at one end and a finger 81 that is coaxially therewith and that projects oppositely of cam follower 80. A second finger 82 is located on a common side of pawl 78 as finger 81. Pawl control plate 84 mounts to gear box 70 to rotatably secure axial pin 76 between bearings 86 and thus secure cam element 72 (along with annular gear 74 mounted thereto) and pawl element 78 of the interior of gear box 70.

Pawl control plate 84 includes a control slot 88 that is operative to engage finger 81, and a guide slot 90 that is adapted to engage finger 82. It should be understood that finger 81 is entirely contained within slot 88 and does not project therefrom. However, finger 82 is dimensioned sufficiently so that a portion thereof projects from slot 90 in order to engage cartridge handling slot 20 of cartridge 18 to move tape cartridge 18 between the extended and retracted positions. Guide slot 90 has a first leg portion 89 in which finger 82 moves when engaging and disengaging the handling slot 20 of cartridge 18. Guide slot 90 has a second leg portion 91 in which finger 82 moves when pawl element 78 moves between the advanced position and the withdrawn position, as described below.

The mechanical driving of cartridge 18 between the extended and retracted positions is accomplished by means of a drive motor 92 that drives a worm gear 94 that engages annular gear 74. To this end, worm gear 94 is supported on a shaft 96 that is rotatably journaled in gear box 70 and is linked to motor 92 by means of drive head 98. Rotation of shaft 96 and worm gear 94 operates to rotate annular gear 74 and thus cam element 72 secured thereto.

Figure 10:
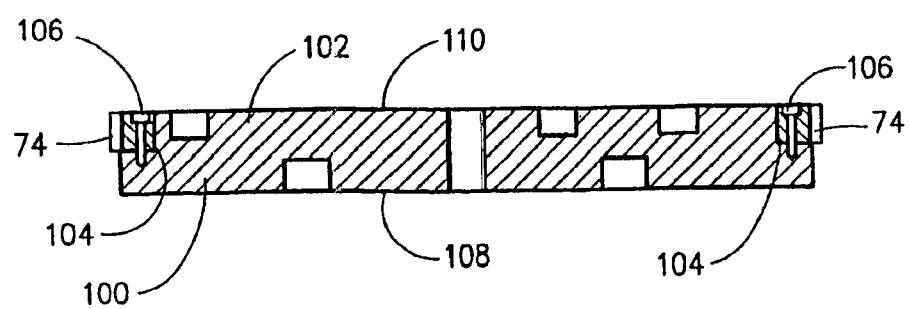
FIG. 10 is a cross-section of the cam element and annular gear used in the drive and camming assembly of FIGS. 7 and 8.

The construction of cam element 72 and annular gear 74 may best be seen in FIGS. 8 and 10. Here, it may be seen that cam element 72 includes a first component or disk section 100 and a second component or disk section 102 that is of slightly smaller diameter than disk section 100 so as to form an annular shoulder 104. It should be understood that disk sections 100 and 102 are formed integrally with one another with shoulder 104 providing an annular seat for annular gear 74. Annular gear 74 may be secured in shoulder 104 by means of set screws 106. Alternatively, of course, cam element 72 and annular gear 74 can be formed as a single piece. In either event, cam element 72 has two cam faces, a first cam face 108 formed on the outer surface of first disk section 100 and a second cam surface 110 formed on the exposed face of second disk section 102.

Figure 11A:
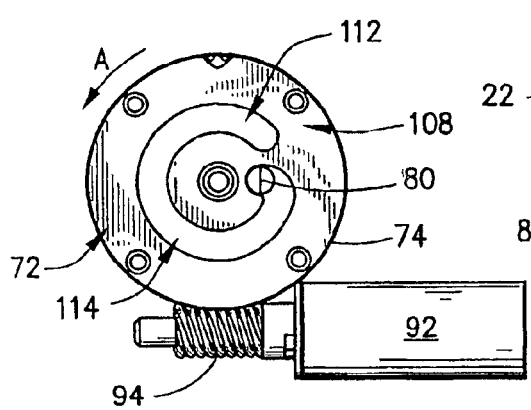
FIGS. 11(a)–11(c) show the first camming surface and groove of the cam element used to move a tape cartridge between the extended position and the received retracted position.
Figure 12A:
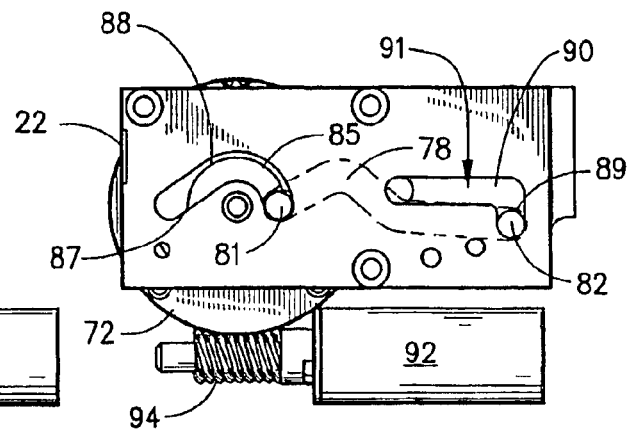
FIGS. 12(a)–12(c) are side views in elevation showing the cam and drive assembly respectively corresponding to FIGS. 11(a)–11(c)

The movement of tape cartridge 18 from the received/extended state to the received/retracted state may now be best appreciated with reference to FIGS. 11(a)–11(c) and 12(a)–12(c). In these Figures, motor 92 and worm gear 94 act to drive cam element 72 in a counterclockwise direction shown by arrow "A". In FIG. 11(a), it may be seen that cam follower pin 80 is disposed in a load section of the camming groove 112 defined by hooked portion 113. Finger 81 extending into but not completely through slot 88, as is shown in FIG. 12(a). Here, also, finger 82 is located in vertical section 91 of slot 90 and is positioned at the lowermost point thereof. As noted above, finger 82 extends through slot 90 and protrudes outwardly therefrom. By being at the lowermost position in vertical section 89 of slot 90 finger 82 is moved so that a cartridge may be inserted into and removed from the bay of tape deck 10. When inserted, the tape cartridge is in the orientation shown in FIG. 5. However, when cam element 72 is rotated a few degrees (approximately five degrees (5°) in the direction of arrow "A", pawl element 78 pivots to the position shown in FIG. 12(b). When this occurs, finger 82 moves upwardly in vertical portion 89 of slot 90. When this occurs, finger 82 moves into cartridge handling slot 20. Continued rotation over approximately two hundred degrees (200°) moves cam element into the position shown in FIG. 11(c). During this motion, finger 81 moves through a first ninety degrees actuate portion 85 of slot 88 after which it moves in a linear portion 87 thereof. Movement of pin 81 in the linear portion moves cam follower pin 80 out of the hooked portion 113 of cam groove 112. It can then dwell in circular dwell section 114 of cam groove 112 for about three hundred and twenty degrees (320°) of rotation. Furthermore, this rotation causes finger 82 to move completely along the length of horizontal portion 91 of slot 90 so as to completely move cartridge 18 from the extended to the retracted position. This corresponds, then to the movement of pawl element form the advanced position shown in FIG. 12(a) to the withdrawn position shown in FIG. 12(c).

Figures 13A, 13B, 13C:
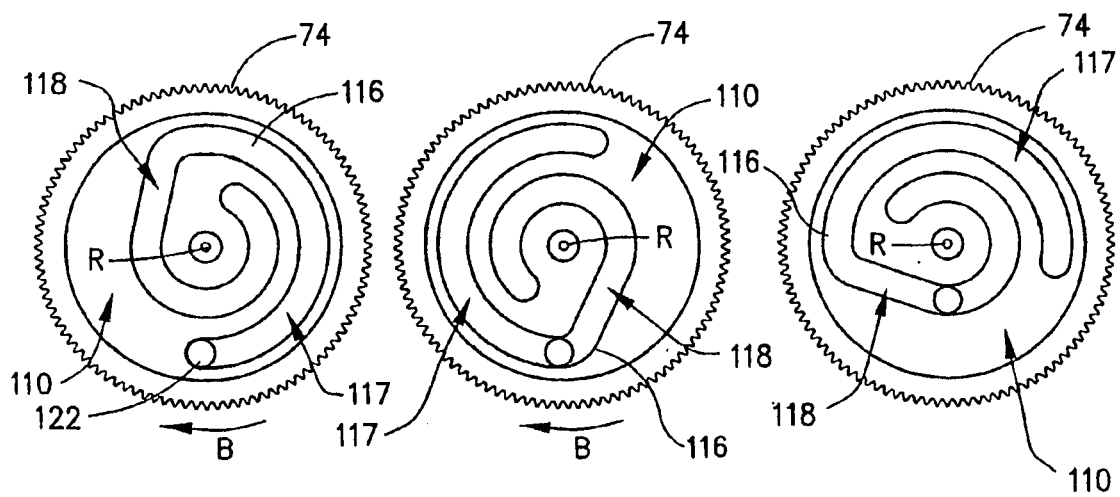
FIGS. 13(a)–13(c) show the second cam surface and groove for the cam element used to move the tape cartridge from the intermediate retracted state to the fully mounted state.
Figure 11B:
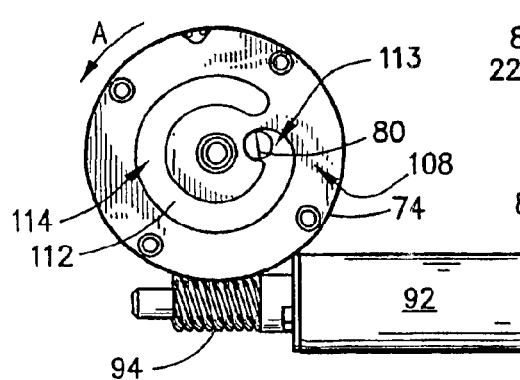
Figure 12B:
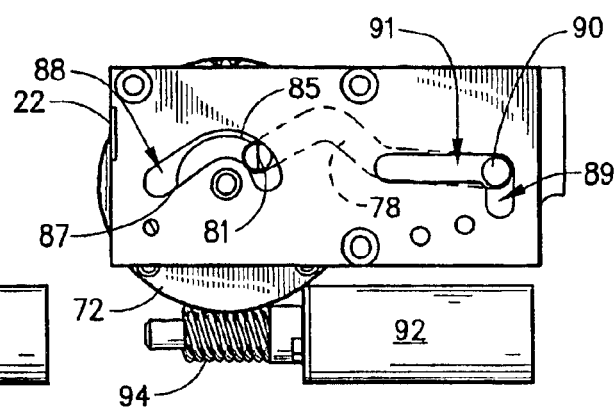
Figure 11C:
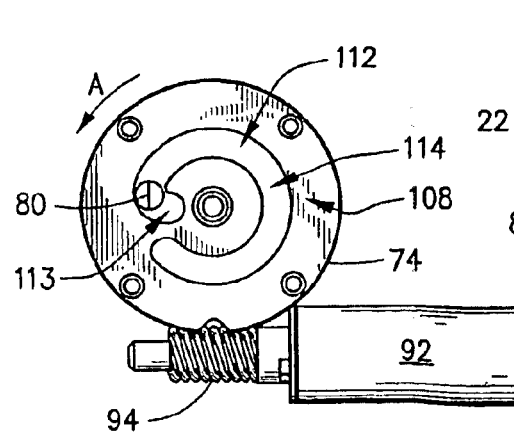
Figure 12C:
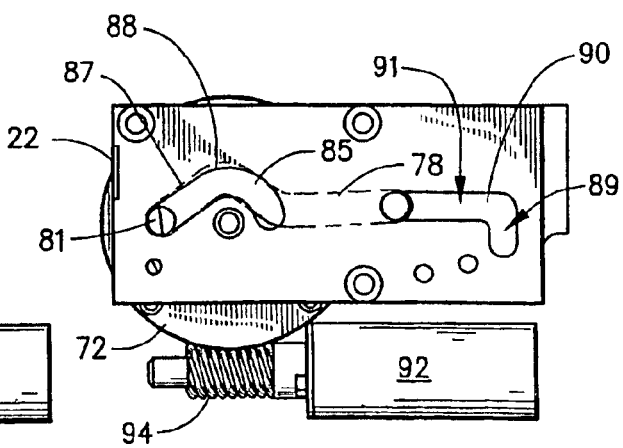

With reference again to FIG. 3, it may be seen that a second cam follower pin 120 is mounted by mounting plate 26 so it is rigidly supported thereby. Cam follower pin 120 forms a linking element to mechanically link sub-frame 50 and main frame 24 for relative pivotal motion. Cam follower pin 120 includes a post 122 which extends through slot 124 in gear box 70 so as to engage second cam groove 116 formed in second cam surface 110 of cam element 72. Rotation of cam element 72 as described with respect to arrow "A" of FIGS. 11(a)–11(c) will cause a clockwise rotation of cam element 72 when in the views depicted in FIGS. 13(a)–13(c). Clockwise rotation in the direction of arrow "B" through approximately one hundred eighty degrees (180°), which corresponds to the rotation in FIGS. 11(a)–11(c) provides a dwell for post 120 in a first arcuate portion 117 of second cam groove 116. This corresponds to rotation shown in FIG. 12(a) moving to the position shown in FIG. 12(b). During the next ninety degrees of rotation in the direction of arrow "B", post 92 moves along linear section 118 of cam groove 116 so that post 22 is moved radially inward with respect to rotational axis "R".

With reference again to FIGS. 6 and 7, it may be appreciated that, since second cam follower pin 120 is mounted rigidly to mounting plate 26 and since gear box 70 is secured to pivoting sub-frame 50, gear box 70 of drive and cam assembly 40 is forced to move downwardly to pivot sub-frame 50 into the mounted state shown in FIG. 6 during this ninety degrees (90°) of rotation. Thus, tape cartridge 18 which is now in the received/retracted position is moved from a demounted state to a mounted state wherein it engages tooth drive 28 and magnet 30. This corresponds to the post and cam orientation of FIG. 13(c), and it may be appreciated that further rotation of cam element 72 provides an approximate one hundred and eighty degrees (180°) dwell by virtue of the movement of post 122 in groove portion 119 of cam groove 116.

With reference again to FIG. 10(c), the ninety degree rotation of cam element 72 which causes the movement of sub-frame 50 from the demounted to the mounted state takes up approximately ninety degrees (90°) of arc of arcuate portion 114 of cam groove 112. Thus, at the conclusion of the pivoting of sub-frame 50 to the mounted state, each of cam grooves 112 and 116 provide an approximate one hundred and eighty degrees (180°) of dwell upon the further driving of cam element 72 by motor 92. This dwell time can be used to provide structure (not shown) for picking the lead end of the tape in cartridge 18 for threading.

Reversing motor 92 causes the demounting and extension of cartridge 18 by reversing the procedure described above. First, sub-frame 50 is moved from the mounted state shown in FIG. 6 to the demounted state shown in FIG. 5 by the relative movement of post 122 in cam groove portion 118 that forces gear box 70 away from mounting plate 26. This breaks the magnetic attraction between tape cartridge 18 and magnet 30 so that cartridge 18 demounted but retracted within sub-frame 50. Continued rotation in the reverse direction then causes pawl 78 to move sequentially from the withdrawn position shown in FIG. 12(c), through the position shown in FIG. 12(b) and finally to the advanced position shown in FIG. 12(a). During this movement, finger 82 moves tape cartridge 18 from the received/retracted state to the received/extended state and finally disengages finger 82 from slot 20. At this point, tape cartridge 18 can be removed from tape deck 10, for example, by an automated library system.

Figure 14:
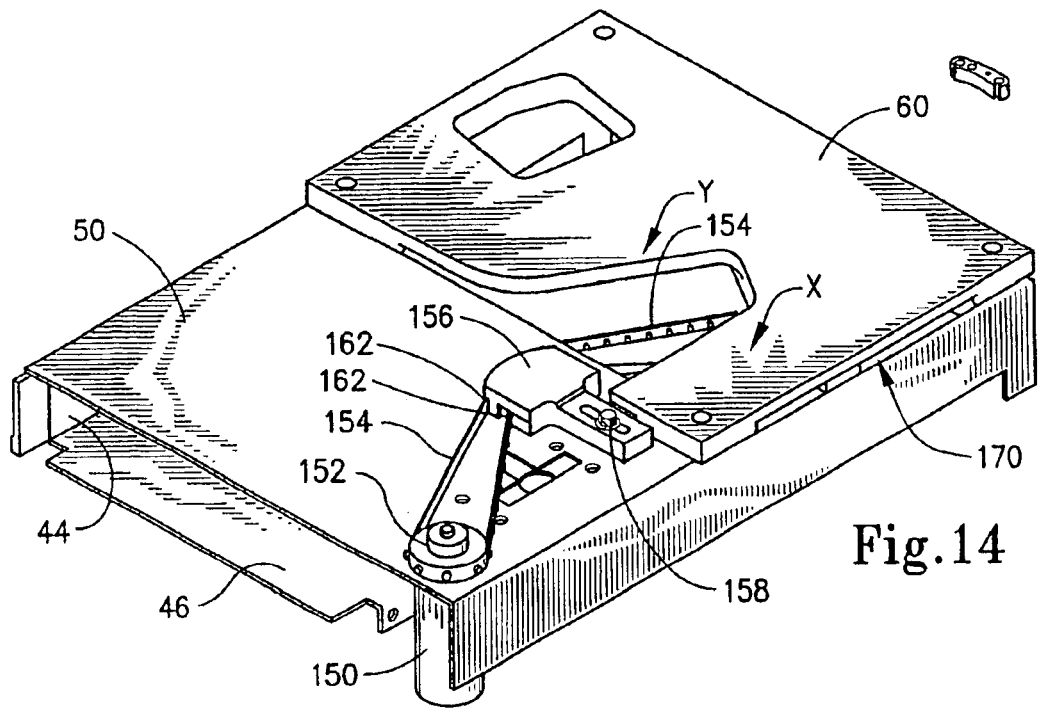
FIG. 14 is a perspective view of the tape cartridge housing and the tape threading assembly of the present invention.
Figure 15:
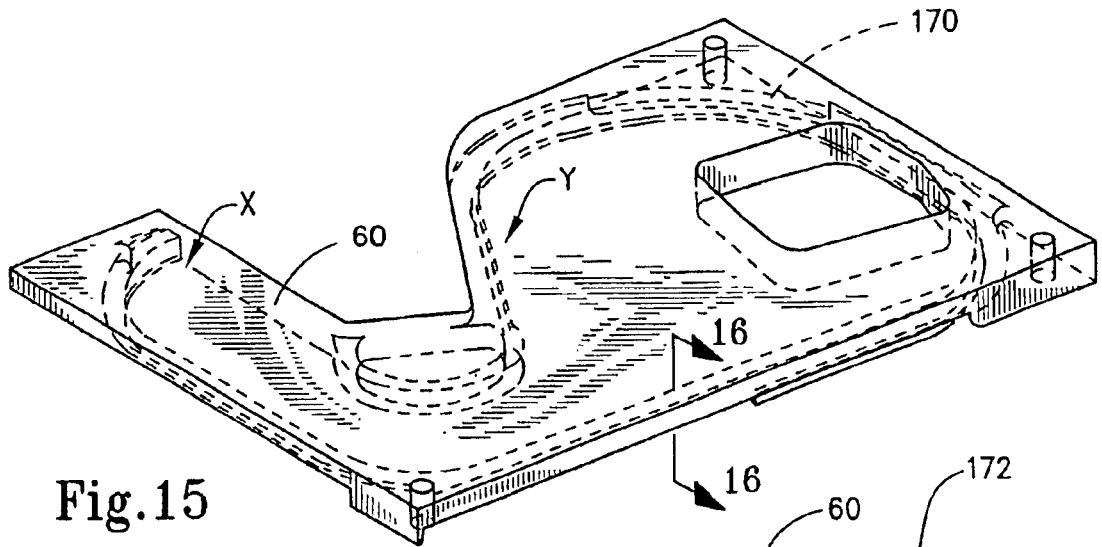
FIG. 15 is a perspective view of the threading plate of the present invention with the threading channel shown in phantom.
Figure 16:
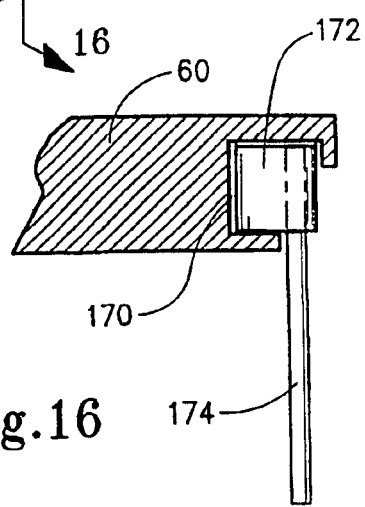
FIG. 16 is a cross-sectional view taken about lines 16—16 of FIG. 15.

While the above-described structure allows for the movement of tape cartridge 18 between the received/extended position and the received/retracted position as well as the demounted state and the mounted state, it is still necessary that the tape from the tape cartridge 18 be threaded around the read/write assembly onto take-up spool 39. This is accomplished by means of a motor 150, shown in FIGS. 2 and 14 which drives a sprocket 152 and a continuous loop belt 154. Belt 154 extends across a lubricious bearing 156 that is provided with mounting slot 158 to secure to sub-frame 50 by means of a screw 160 so that suitable tensioning on belt 154 may be provided by bearing surfaces 160 and 162. Belt 154 extends through a threading channel 170 shown in phantom in FIG. 15 wherein threading channel 170 forms a serpentine path in guide plate 60. As is shown in FIG. 16, threading channel 70 in guide plate 60 is sized to receive a carriage piece 172 which may advance from a start location designated as "X" in channel 170 around the perimeter of guide plate 60 to terminate at a radially interior location "Y" adjacent the hub of take-up spool 39. Carriage piece 172 includes an elongated arm 174 extending therefrom with arm 174 adapted to engage the standard threading piece on the end of the tape in tape cartridge 18, as is known in the art.

Accordingly, it should be appreciated that, after the mounting of tape cartridge 18, motor 150 may be activated to rotate sprocket 152 so that the end of the tape is threaded around air bearings 32, 34 and 36 after which it is threaded across read/write head 42 and around air bearing 38 where the end of the tape is then advanced to and engaged with the hub of take-up spool 39. The tape medium may be then wound onto spool 39 while information is transferred to or read from the tape as it passes over read/write head 42. After completion of the read/write task, the tape is unwound off of spool 32 and the end of the tape is then reversed through threading channel 170 and release tape cartridge 18.

In order to initially access the lead end of the tape in tape cartridge 18, it is usually necessary to open a small tape access door 21 on the edge of cartridge 18. To this end, pawl control plate 84 is provided with a small flange 22 (FIGS. 9, 12(a)–12(c)) that engages tab 23 on the door 21 when cartridge 18 is moved from the received/extended state to the received/retracted state.

It may also be appreciated that since sub-frame 50 is pivotally secured at hinge 54 to mounting plate 26 and since mounting plate 26 is mechanically interlocked to sub-frame 50 by way of post 120 engaging cam element 72 the disengagement of cam element 72 by post 120 will permit sub-frame 50 to be pivoted 90 degrees with respect to mounting plate 26. Such pivotal movement exposes the internal parts of tape deck 10 for purposes of maintenance.

The present invention is also directed to a method of mounted and demounted a tape cartridge containing a tape medium onto a read/write recording assembly. This method may include any of the processing steps inherent in the above described structure. Broadly, though, the method of this invention includes inserting the tape cartridge into a bay formed on the sub-frame that is pivotally secured to the main frame of the read/write recording assembly to define a received/extended state for the tape cartridge. The method includes the step of engaging the tape cartridge and advancing it from the received/extended state to a received/ retracted state. The sub-frame is then pivoted relative to the main frame from a first position to a second position to move the tape cartridge from a demounted state into a mounted state relative to the read/write recording assembly. The tape medium is then advanced through the read/write recording apparatus to perform a read/write function thereon. After performing the read/write function, the tape medium is restored in the tape cartridge. The sub-frame is then pivoted from the second position to the first position to demount and move the tape cartridge into the received/retracted position. The method then includes the step of advancing the tape cartridge from the received/retracted position to the received/extended position and disengaging and removing the tape cartridge from the bay of the sub-frame.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiments of the present invention without departing from the inventive concepts contained herein.

We claim:

1. Docking apparatus operative to receive a tape cartridge and mount and demount said cartridge relative to a tape read/write assembly, comprising:
    (A) a bay structure adapted to receive said cartridge to define a received/extended position therefor;
    (B) a pawl element including a first pawl end portion and a second pawl end portion opposite said first pawl end portion and movable between an advanced position and a withdrawn position, said first pawl end portion adapted to engage and disengage said tape cartridge when said tape cartridge is in the received/extended position and said pawl element is in the advanced position;
    (C) a cam assembly engaging said second end portion of said pawl element, said cam assembly operative upon being driven in a first mode to move said pawl element from the advanced position to the withdrawn position thereby to move the cartridge from the received/extended position to a received/retracted position and further operative to advance the cartridge into a mounted state relative to said tape read/write assembly, said cam assembly operative upon being driven in a second mode to move the cartridge from the mounted state into a demounted state relative to said tape read/write assembly and further operative to move said pawl element from the withdrawn position to the advanced position thereby to move the cartridge from the received/retracted position to the received/extended position; and
    (D) a drive operative to actuate said cam assembly selectively in the first and second modes.

2. Docking apparatus according to claim 1 wherein said cam assembly includes a rotatable cam element, said drive operative in the first mode to drive said cam element in a first angular direction and in the second mode to drive said cam element in a second angular direction oppositely of the first angular direction.

3. Docking apparatus according to claim 2 wherein said cam element has a first surface with a docking cam groove formed therein, the second end portion of said pawl element including a cam follower disposed thereon and engaging the docking cam groove.

4. Docking apparatus according to claim 3 wherein said docking cam groove has a load section and a docking dwell section, said cam follower residing in the load section while said pawl element is advanced between the advanced and withdrawn positions.

5. Docking apparatus according to claim 3 wherein said cam element has a second surface with a mounting cam groove formed therein, and including a link element engaging said mounting cam groove and operative to move the tape cartridge between the mounted and demounted states.

6. Docking apparatus according to claim 5 wherein said mounting cam groove has a mounting dwell section and a mounting section, said link member residing in said mounting dwell section when said pawl element is moved between the advanced and withdrawn positions.

7. Docking apparatus according to claim 2 wherein said cam assembly includes a pawl control plate operative to control said pawl element as it moves between the advanced position and the withdrawn position.

8. Docking apparatus according to claim 7 wherein said pawl control plate has a guide slot that is operative to engage said first end portion of said pawl element and a control slot that is operative to engage said second end portion of said pawl element.

9. Docking apparatus according to claim 8 wherein said pawl element includes a first finger that engages the guide slot and a second finger that engages the control slot.

10. Docking apparatus according to claim 9 wherein said cartridge has a handling slot, said first finger being sized to extend through the guide slot and selectively engage and disengage the handling slot on said cartridge.

11. Docking apparatus according to claim 10 wherein the guide slot has a first leg portion and a second leg portion, said first finger moving in the first leg portion when said first finger moves into engagement and disengagement with the handling slot and said first finger moving in the second leg portion when said pawl element moves between the advanced position and the withdrawn retracted position.

12. Docking apparatus according to claim 7 wherein said cartridge includes a tape access door, said pawl control plate including a flange positioned to engage and open said tape access door when said cartridge moves from the received/extended position to the received/retracted position.

13. Docking apparatus operative to receive a tape cartridge and mount and demount said cartridge relative to a tape read/write assembly, comprising:
    (A) a main frame for said tape read/write assembly;
    (B) a subframe pivotally secured to said main frame and movable between a first position to define a demounted state for said cartridge and a second position to define a mounted state for said cartridge, said subframe including a docking bay adapted to receive said tape cartridge to define a received/extended position therefor;
    (C) a pawl element including a first pawl end portion and a second pawl end portion opposite said first pawl end portion and movable between an advanced position and a withdrawn position, said first pawl end portion adapted to engage and disengage said tape cartridge when said tape cartridge is in the received/extended position and said pawl element is in the advanced position;
    (D) a linking element associated with said main frame and said subframe;
    (E) a cam assembly adapted to be driven in first and second modes and including
        (1) a first cam component engaging said second end portion of said pawl element, said first cam component operative when said cam assembly is driven in the first mode to move said pawl element from the advanced position to the withdrawn position, said first cam component operative when said cam assembly is driven in the second mode to move said pawl element from the withdrawn position to the advanced position thereby to move the cartridge from the received/retracted position to the received/extended position; and (2) a second cam component engaging said link element, said second cam component operative when said cam assembly is driven in the first mode to move said subframe from the first position to the second position thereby to define a mounted state for said cartridge, said first cam component operative when said cam assembly is driven in the second mode to move said subframe from the second position to the first position thereby to define a demounted state for said cartridge; and (E) a drive operative to actuate said cam assembly selectively in the first and second modes.

14. Docking apparatus according to claim 13 wherein said cam assembly includes a rotatable cam element, said drive operative in the first mode to drive said cam element in a first angular direction and in the second mode to drive said cam element in a second angular direction oppositely of the first angular direction.

15. Docking apparatus according to claim 14 wherein said cam element has a first surface with a docking cam groove formed therein, the second end portion of said pawl element including a cam follower disposed thereon and engaging the docking cam groove.

16. Docking apparatus according to claim 15 wherein said cam element has a second surface with a mounting cam groove formed therein, said linking element engaging the mounting cam groove whereby rotation of said cam element pivots said main frame and said subframe with respect to one another.

17. Docking apparatus according to claim 13 wherein said cam assembly includes a pawl control plate operative to control said pawl element as it moves between the advanced position and the withdrawn position.

18. Docking apparatus according to claim 17 wherein said pawl control plate has a guide slot that is operative to engage said first end portion of said pawl element and a control slot that is operative to engage said second end portion of said pawl element.

19. Docking apparatus according to claim 17 wherein said cartridge includes a tape access door, said pawl control plate including a flange positioned to engage and open said tape access door when said cartridge moves from the received/extended position to the received/retracted position.

20. Docking apparatus according to claim 13 wherein said cam assembly is mounted to said subframe.

21. Docking apparatus according to claim 20 wherein said drive is mounted to said cam assembly.

22. Docking apparatus according to claim 20 including a pawl control plate mounted to said cam assembly, said pawl element being supported by said pawl control plate and said cam assembly.

23. A read/write recording assembly adapted to receive a tape cartridge containing a tape medium and operative to perform a read/write function thereon as said tape medium advances therein, comprising:

(A) a main frame for said tape read/write recording assembly;

(B) a subframe pivotally secured to said main frame and movable between a first position to define a demounted state for said cartridge and a second position to define a mounted state for said cartridge, said subframe including a docking bay adapted to receive said tape cartridge to define a received/extended position therefor;

(C) a read/write recording head disposed on said main frame;

(D) first bearing member located at an upstream location relative to said read/write recording head and second bearing member located at a downstream location relative to said read/write recording head;

(E) a take-up mechanism supported on said main frame and including a hub having an outer surface about which the tape medium is to be wound;

(F) a rotatable drive operative to rotate said hub thereby to wind said tape medium thereon;

(G) a threading assembly operative to transport a free end of the tape medium between said tape cartridge and said take-up mechanism;

(H) a pawl element including a first pawl end portion and a second pawl end portion opposite said first pawl end portion, said pawl element movable between an advanced position and a withdrawn position, said first pawl end portion adapted to engage and disengage said tape cartridge when said tape cartridge is in the received/extended position and said pawl element is in the advanced position;

(I) a cam assembly engaging said second end portion of said pawl element, said cam assembly operative upon being driven in a first mode to move said pawl element from the advanced position to the withdrawn position thereby to move the cartridge from the received/extended position to a received/retracted position and further operative to move said subframe from the first position to the second position thereby to define a mounted state for said cartridge relative to said tape read/write assembly, said cam assembly operative upon being driven in a second mode to move said subframe from the second position to the first position thereby to define a demounted state for said cartridge relative to said tape read/write assembly and further operative to move said pawl element from the withdrawn position to the advanced position thereby to move the cartridge from the received/retracted position to the received/extended position; and (J) a drive operative to actuate said cam assembly selectively in the first and second modes.

24. A read/write recording assembly according to claim 23 wherein said cam assembly is disposed on said subframe.

25. A read/write recording assembly according to claim 23 wherein said threading assembly is disposed on said subframe.

26. A read/write recording assembly according to claim 25 wherein said cam assembly is disposed on said subframe.

27. A method of mounting and demounting a tape cartridge containing a tape medium onto a read/write recording assembly that includes a main frame and performing a read/write function thereon, comprising:

(A) inserting the tape cartridge into a bay formed on a subframe that is pivotally secured to the main frame of said read/write recording assembly to define a received/extended state for the tape cartridge;

(B) engaging said tape cartridge and advancing said tape cartridge from the received/extended state to a received/retracted state;

(C) pivoting said subframe relative to said main frame from a first position to a second position to move said tape cartridge from a demounted state into a mounted state relative to said read/write recording assembly;
(D) advancing the tape medium through said read/write recording assembly to perform a read/write function thereon;
(E) restoring the tape medium in said tape cartridge;
(F) pivoting said subframe from the second position to the first position to demount and move said tape cartridge into the received/retracted state;
(G) advancing said tape cartridge from the received/retracted state to the received/extended state; and
(H) disengaging and removing said tape cartridge from the bay.

* * * * *